Oct. 28, 1958 R. N. RHODES 2,858,367
COLOR TELEVISION
Filed July 15, 1954
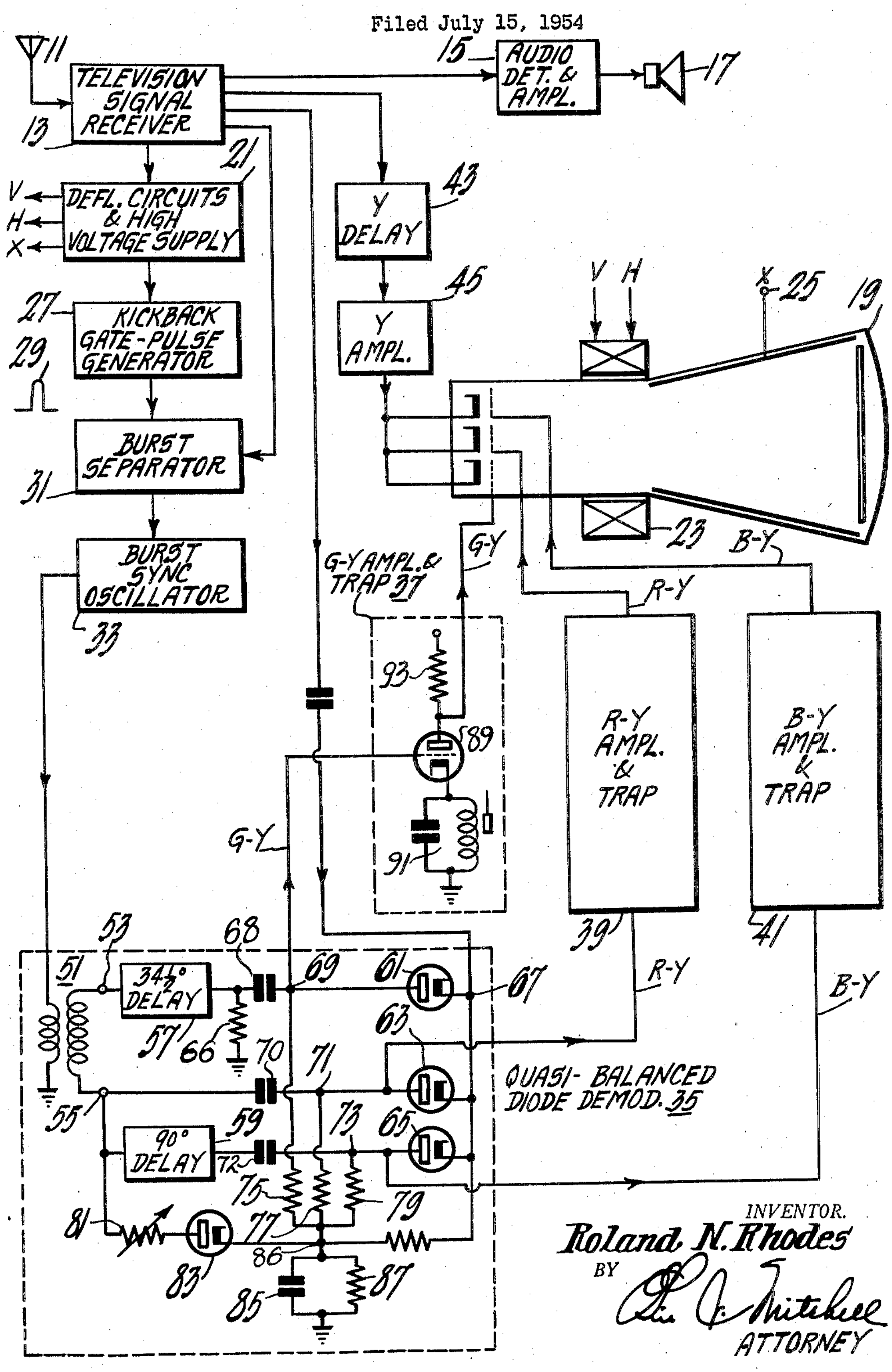
INVENTOR.
Roland N. Rhodes
BY
ATTORNEY

United States Patent Office 2,858,367
Patented Oct. 28, 1958

2,858,367

COLOR TELEVISION

Roland N. Rhodes, Levittown, Pa., assignor to Radio Corporation of America, a corporation of Delaware Application July 15, 1954, Serial No. 443,499

19 Claims. (Cl. 178—5.4)

The present invention relates to matrix and demodulating circuits, and more particularly to matrix and demodulating circuits of the type employed in color television receivers.

Color images may be transferred electrically by analyzing the light from an object into not only its image elements, as is accomplished by normal scanning procedure, but also by analyzing the light from elemental areas of the image into the selected primary or component colors and thereby deriving therefrom a signal representative of each of the selected color components. A color image may then be reproduced at a remote point by appropriate reconstruction from a component color signal train.

The method proposed for transmitting a color television picture is one based on a set of standards which were authorized by the Federal Communications Commission on December 17, 1953. These standards describe a composite color television signal which contains both the chrominance information or monochrome information relating to the scene and also a color modulated subcarrier which uses the process of synchronous detection may be employed to provide color-difference or chrominance signals which describe how each color in the televised scene differs from the monochrome version of the color having the same luminance. It is therefore necessary in a color television receiver to provide means for not only demodulation of the component color-difference or chrominance information, but also to provide matrix circuits which can be utilized to produce suitable combinations of chrominance signals so as to produce a desired set of color-difference signals which, when combined with the monochrome information, yield the recovered component color signals.

The present invention is devoted to a teaching of combined simplified demodulating and matrix means which accomplish this purpose in a novel and direct fashion.

In order to best appreciate the teachings of the present invention, consider in more detail the precise nature of the composite color television signal which conforms to the Federal Communications Commission standards. Three primary colors, red, green, and blue are utilized for a description of the color residing in the image to be transmitted. These three primary colors do not appear equally bright because they are located in different parts of the spectrum and hence stimulate the brightness sensation by different amounts. However, if the three primary colors are mixed in the right proportions, it is found that the green primary, which is located at the center of the visible spectrum, accounts for 59% of the brightness sensation while the blue and red primaries account for 11% and 30%, respectively. Thus utilizing a color television signal or Y signal according to the equation $$Y=0.30R+0.59G+0.11B \quad (1)$$

a monochrome signal may be produced; this monochrome signal is generated in accordance with the existing scanning standards; i. e. 525 lines, 60 fields per second and 30 frames per second and treated exactly like a standard monochrome signal with respect to bandwidth and the addition of synchronizing and blanking pulses.

In order to produce color pictures for the color transmission to a color receiver, it is necessary to produce three independent color difference signals since color involves three independent variables. These color difference signals are designated as $R-Y$, $G-Y$, and $B-Y$ and indicate, as previously described, how each color in the televised scene differs from the Y signal.

These color-difference signals may be written in the following way to constitute a set of three independent signals:

$$R-Y=0.70R-0.59G-0.11B \quad (2)$$

$$G-Y=-.30R+0.41G-0.11B \quad (3)$$

$$B-Y=0.30R-0.59G+0.89B \quad (4)$$

where Y is described by Equation 1. These equations cannot be solved for R, G, and B in terms of $R-Y$, $G-Y$, and $B-Y$, but they may be solved to yield any single chrominance signal in terms of the other two; for example $$G-Y=-0.51(R-Y)-0.19(B-Y) \quad (5)$$

The chrominance or color-difference information is transmitted on a modulated subcarrier which contains not only the signals described by Equations 2, 3, and 4, but also a continuous change of hue as a function of angle in the modulated color subcarrier. The process of recovering one or more of the color-difference signals is to utilize the principles of synchronous detection wherein a locally generated signal in the receiver having the frequency of the color subcarrier but a particular phase relating to the particular color-difference signal being detected, is heterodyned with the modulated color subcarrier to produce the desired color-difference signal. If a multiplicity of color-difference signals are required, then a series of heterodyning signals must be provided, each accurately phased with respect to the corresponding color-difference signal demodulated.

In order to make the employment of the processes of synchronous detection possible, synchronizing means are provided which utilize a color synchronizing burst which is transmitted on the back porch of the horizontal synchronizing pulse. This color synchronizing burst has the frequency, 3.58 mc. of the color subcarrier, and is phased with respect to the color-difference signals in a manner whereby, for example, the phase of the color synchronizing burst leads the phase of the $R-Y$ signal by 90°, the phase of the $R-Y$ signal leading the phase of the $B-Y$ signal by 90° and the phase of the $G-Y$ signal by 214.3°.

If a multiplicity of color-difference signals are required, then the processes of synchronous detection may be utilized to provide these signals. The teachings of the present invention are devoted to the principles and concepts which provide simplified demodulator means which yield a trio of required color-difference signals from a modulated color subcarrier in a manner involving not only new and novel concepts, but also simplification of circuitry, D.-C. coupling, directness of approach and ease in adjustment.

It is one object of this invention to permit the use of simple demodulators in color television receivers whose local subcarrier signals may vary in amplitude.

It is still another object of this invention to provide a simple multipath diode demodulator circuit which is quasi-balanced.

It is yet another object of this invention to provide a simplified diode demodulator circuit of balanced characteristics and of simplified circuitry.

According to the invention, the use of simple diode demodulators in color television receivers where the local subcarrier signal varies in amplitude is given improved performance by peak-detecting the subcarrier and then subtracting the resulting detection voltage from the outputs of the chrominance signal synchronous detectors.

In one form of the invention a diode path is used for each of the color-difference signals being synchronously detected. The diode path includes a diode in series with a decay network and also includes means for utilizing the local subcarrier signal of proper phase for causing the diode to conduct at time intervals corresponding to the particular color-difference signal being detected. A fourth diode-decay network path is provided which follows the envelope of the local subcarrier. By utilizing a suitable resistance network the signal provided by the subcarrier envelope detecting network is combined with the outputs from the various color-difference demodulator paths in a way whereby cancellation of the variations in the envelope of the local subcarrier signal are balanced out.

Other and incidental objects and advantages of the invention will become apparent upon a reading of the following specification and an inspection of the sole figure which illustrates a block diagram of a color television receiver which employs one embodiment of the present invention; the details associated with this embodiment are illustrated by the use of a schematic diagram.

Consider now the block diagram of the color television receiver as shown in the figure. Here the incoming signal arrives at the antenna 11 and is applied to the television signal receiver 13. The television signal receiver 13 then delivers a recovered color television signal including the sound information which is transmitted on a sound carrier 4½ mcs. removed from the picture carrier. The television signal receiver 13 includes the functions of first detection, intermediate frequency amplification, second detection and automatic gain control. Many of these functions are described in chapter 22 of the book "Harmonics, Sidebands and Transients in Communication Engineering," by C. Louis Cuccia, published by the McGraw-Hill Book Company in 1952.

The sound information is then recovered by using, for example, the well known principles of intercarrier sound. In the audio detector and amplifier 15 the recovered information is then applied to the loud speaker 17.

The color television signal information relating to the image is accommodated in at least four branches or channels of the color television receiver, these branches being adapted to produce the recovered color signals which are applied to the color kinescope 19.

One branch emanating from the television signal receiver 13 is concerned with the picture synchronizing signals. This branch applies the color television signal to the deflection circuits and high voltage supply 21 which delivers deflection signals to the yokes 23, in addition to a high voltage signal to the ultor 25. Another function of the deflection circuits and high voltage supply 21 is to activate the kickback gate pulse generator 27. The kickback gate pulse generator 27 is usually a winding which is included on the high voltage supply transformer; it has the function of providing a gating pulse 29 during the horizontal blanking period.

Another branch emanating from the television signal receiver 13 impresses the color television signal on the burst separator 31 upon which is also impressed the kickback pulse 29. The kickback pulse is timed whereby it opens a burst gate during the duration interval of the color synchronizing burst thereby causing burst separation. The separated burst is then fed by the burst separator 31 to the burst synchronized oscillator 33 which, utilizing the separated burst and the kickback pulse 29 produces a local oscillator signal which is accurately synchronized with the phase and frequency of the color synchronizing burst.

Another branch emanating from the television signal receiver 13 impresses at least the chrominance information on the quasi-balanced diode demodulator 35 which produces the demodulated $G-Y$, $R-Y$, and $B-Y$ signals at low level. The color-difference signals as produced by the quasi-balanced diode demodulator 35 still include signal components in the vicinity of the color subcarrier. By passing the color-difference signals through combined amplifiers and traps whereby the $G-Y$ signal passes through the $G-Y$ amplifier and trap 37, the $R-Y$ signal passes through the $R-Y$ amplifier and trap 39, and the $B-Y$ signal passes through the $B-Y$ amplifier and trap 41, the $G-Y$, $R-Y$, and $B-Y$ signals are both filtered with regard to higher frequencies in the vicinity of the color subcarrier and also raised to an amplitude level whereby they may be applied directly to the control grids of the color kinescope 19.

At the same time the color television signal issuing from the television signal receiver 13 passes through the Y delay line 43 and into the Y amplifier 45. The Y amplifier 45 impresses the Y information or luminance information on the cathodes of the color kinescope 19 so that the Y signal is added to the $G-Y$, the $R-Y$, and the $B-Y$ signals, respectively, by action of the respective control grids in conjunction with the cathodes of the color kinescope 19.

Turning now in detail to the operation of the quasi-balanced diode demodulator 35, it is seen that the burst sync oscillator 33 delivers a signal to the transformer 51. At one terminal 55 of the transformer 51 a signal suitable for the synchronous detection of the $R-Y$ information is produced. The oscillator signal appearing at the other terminal 53 of the transformer 51 is 180° out of phase with respect to the signal appearing at the terminal 55. By passing this delayed signal through the delay line 57 which provides an additional phase delay of 34.5° a synchronous detection signal suitable for the demodulation of the $G-Y$ signal is produced. The local oscillator signal produced at the transformed terminal 55 is also applied through the delay line 59 which provides a 90° phase delay to yield a third synchronous detection signal which in this case is properly phased for the $B-Y$ signal.

Three paths, each utilizing a diode and a decay network, are then provided with a synchronous detection signal of proper phase so that the three color-difference signals required will be demodulated. Included in each of the demodulator paths is a decay network.

In the case of the $G-Y$ path, the rectifier 61 at whose cathode the chroma signal is impressed is operated in conjunction with the decay network made up of the condenser 68 and the resistor 66 which is connected to ground and the resistor 75 which is connected to the terminal 86.

The demodulator path which is suitable for demodulation of the $R-Y$ signal includes the diode 63 on whose cathode the chroma information is impressed. The anode of the diode 63 is coupled to the decay network made up of the condenser 70 and the resistor 77, and the signal produced by the terminal 55. In like fashion, the $B-Y$ demodulator path includes the diode 65 on whose cathode the chroma is impressed and in whose anode circuit is included the synchronous detection signal from the delay line 59 and the decay network made up of the condenser 72 and the resistor 79.

Note that the resistors 75, 77, and 79 are connected to the terminal 86. This terminal 86 is a reference potential point of the detector circuit made up of the rectifier 83 and the decay network made up of the resistor 87 and the condenser 85. The diode 83 in conjunction with the decay network made up of the resistor 87 and the condenser 85 peak-detect the subcarrier signal so that a signal representative of the amplitude of the subcarrier produced by the burst synchronized oscillator 33 is produced between terminal 86 and ground. The actual magnitude of this signal may be controlled by adjustment of the variable resistor 81. If there is any variation of the subcarrier amplitude level, this variation will appear between terminal 86 and ground; this variation will also cause corresponding variations in the detected $G-Y$, $R-Y$, and $B-Y$ signals.

To prevent either changing of the D.-C. levels of the color-difference signals or the adding of the envelope variation to the color-difference signals, the signal provided at the terminal 86 by the subcarrier peak-detection circuit employing the diode 83, the condenser 85 and the resistor 87, is then caused to provide a signal of opposite polarity to the signals caused by the subcarrier rectification of the synchronous detectors. The actual balance is controlled by adjustment of the variable resistor 81. The time constant of the decay network made up of the resistor 87 and the condenser 85 is chosen to equal that of the synchronous detectors so that the balance is maintained over a wide range of frequencies. However, its impedance is so low that it does not interfere with the normal operation of the circuit. In an actual operating circuit it has been found expedient to utilize, for example, the values of 1000 ohms and 390 $\mu\mu$f. for the resistor 87 and the condenser 85, respectively.

The color-difference signals as yielded by the quasi-balanced diode demodulator 35 will contain high frequency components particularly in the vicinity of the color subcarrier frequency. It is possible to provide suitable filtering circuits in the quasi-balanced diode demodulator 35; however, it is more expedient to incorporate suitable filtering action in a succeeding amplifier stage since it is important in any case that the signals produced by the quasi-balanced demodulator 35 be raised to an amplitude level which is suitable for driving the control electrodes of a color image reproducer such as the color kinescope 19. One typical method of producing filtering action is to utilize the simple amplifier circuit of the type shown as the $G-Y$ amplifier and trap 37. In this circuit, a tuned resonant circuit 91 is included between the cathode of the electron tube 89 and ground. This tuned circuit then causes a degeneration action which reduces the amplification in the vicinity of the color subcarrier frequency thereby eliminating these frequencies in the $G-Y$ signal which is produced across the output load 93. The signal produced across the output load 93 represents then the $G-Y$ signal which can be applied directly to the control grid of the color kinescope 19.

Having described the invention, what is claimed is:

1. A color television synchronous detector circuit adapted to receive a modulated color subcarrier containing a plurality of modulating signals, each of said plurality of modulating signals susceptible to demodulation by the processes of synchronous detection and identifiable by a predetermined phase of said modulated subcarrier, said synchronous detector circuit comprising in combination, a plurality of component modulating wave synchronous detectors, a heterodyning subcarrier generator, means for coupling said heterodyning subcarrier generator to each of said component modulating wave synchronous detectors to provide heterodyning waves of predetermined phase at each of said component modulating wave synchronous detectors, a peak detector circuit, means for coupling said peak detector circuit to said heterodyning subcarrier generator to develop a first reference signal related to the amplitude of the output of said heterodyning subcarrier generator, means for coupling said first reference signal to each of said component modulating wave synchronous detectors to provide compensation to the output signal of each of said component modulating wave synchronous detectors for variations in the amplitude of the wave produced by said heterodyning subcarrier generator.

2. The invention as set forth in claim 1 and wherein each of said synchronous detectors consists of a rectifier in association with a decay circuit operatively connected to form an envelope sampling circuit.

3. A color television synchronous detector circuit adapted to receive a modulated color subcarrier containing a plurality of modulating signals, each of said plurality of modulating signals susceptible to demodulation by the processes of synchronous detection and identifiable by a predetermined phase of said modulated subcarrier, said synchronous detector circuit comprising in combination, an input circuit, a plurality of synchronous detection circuits, means for coupling each of said plurality of synchronous detector circuits to said input circuit, a heterodyning subcarrier generator coupled to each of said plurality of synchronous detectors to provide a heterodyning subcarrier to each of said plurality of synchronous detectors having predetermined phases corresponding to the modulating signals to be synchronously detected in that synchronous detector, a D.-C. level circuit coupled to each of said synchronous detector circuits and adjusted to produce a first reference signal having a prescribed relationship with respect to rectification of said modulated subcarrier in each of said plurality of said synchronous detector circuits, a heterodyning subcarrier detector circuit, said heterodyning subcarrier detector circuit coupled to said heterodyning subcarrier generator and adjusted to yield a second reference signal whose amplitude level follows the level of said heterodyning subcarrier, means for subtracting said second reference signal from said first reference signal.

4. A color television demodulator circuit, said demodulator circuit adapted to receive a modulated color information wave containing a plurality of modulating signals, each of said plurality of modulating signals susceptible to demodulation by the processes of envelope sampling at predetermined time intervals, said demodulator circuit comprising in combination, a plurality of envelope sampling circuits, and an envelope sampling signal generator, said envelope sampling signal generator coupled to each of said plurality of envelope sampling circuits and adjusted to provide an envelope sampling signal of a predetermined time interval in each of said plurality of envelope sampling circuits, a detector circuit coupled to said envelope sampling signal generator and operatively connected to produce a reference signal indicative of the amplitude level of the output of said envelope sampling signal generator, means for subtracting said reference signal from the D.-C. level of the amplitude sampling signals produced in each of said plurality of envelope sampling circuits to compenate for variations in amplitude level of said envelope sampling signal generator according to a predetermined characteristic.

5. The invention as set forth in claim 4 and wherein each of said envelope sampling circuits includes a rectifier and a decay circuit, said rectifier responsive to said envelope sampling signal generator whereby said rectifier conducts for a predetermined time interval and develops the modulating signal in said decay circuit corresponding to said predetermined time interval.

6. The invention as set forth in claim 4 and wherein said detector circuit includes a rectifier in series with a decay circuit, means whereby said rectifier in series with said decay circuit is coupled to the output of said envelope sampling signal generator whereby said reference signal is developed in said decay circuit to yield an indication of the amplitude level of the output of said envelope sampling signal generator.

7. In a color television receiver, said color television receiver adapted to receive a color television signal, said color television signal including a color synchronizing burst having a predetermined frequency and phase and modulated subcarrier, said modulated subcarrier containing a plurality of color-difference signals, each of said plurality of color-difference signals susceptible to the processes of synchronous detection and identified by a predetermined phase, said color television receiver also including a burst synchronized signal source including synchronizing circuits responsive to said color synchronizing burst for developing a reference signal having a frequency and phase prescribed by said color synchronizing burst, a quasi-balanced demodulator circuit comprising in combination, a first envelope sampling circuit, a second envelope sampling circuit, and a third envelope sampling circuit, each of said envelope sampling circuits operatively connected to receive said modulated subcarrier and a reference signal to provide envelope sampling at a predetermined time interval corresponding to a predetermined phase of said reference signal and including an output terminal, an output reference potential terminal and a fixed potential terminal, means for developing at said output reference potential terminal a first signal indicative of the amplitude level of said reference signal being employed in the processes of envelope sampling, a detector circuit, including a detection signal developing circuit, means for utilizing said detector circuit to detect a second signal indicative of the amplitude level of said reference signal and means for coupling said detection signal developing circuit between said output reference level terminal and said fixed potential terminal to subtract said second signal from said first signal to provide compensation in the amplitude variations in detected color-difference signals appearing at each of the output terminals of said first envelope sampling circuit, said second envelope sampling circuit, and said third envelope sampling circuit corresponding to variations in amplitude of said reference signal.

8. The invention as set forth in claim 7 and wherein each of said envelope sampling circuits includes an input terminal, a rectifier and a decay circuit and a delay line, means for coupling said decay circuit between said output terminal and said output reference potential terminal, means for coupling said modulated subcarrier to said input circuit, means for coupling said rectifier between said input circuit and said decay circuit, means for coupling said delay line between a predetermined side of said rectifier and said burst synchronized signal source to cause envelope sampling of said modulated subcarrier at a time interval corresponding to the phase determined by said delay line.

9. The invention as set forth in claim 7 and wherein said detector circuit includes an input terminal, a rectifier network, a decay network, and a reference potential terminal, said rectifier network coupled in series with said decay network between said input terminal and said fixed potential terminal and means for coupling a detected voltage as produced in said decay circuit between said output reference potential terminal and said fixed potential terminal.

10. The invention as set forth in claim 7 and wherein each of said envelope sampling circuits includes a filter network, said filter network to be coupled to said output terminal and utilized for eliminating a predetermined range of frequencies from the signal as provided by said envelope sampling circuit.

11. In a color television receiver, said color television receiver including a source of color television signals including a color synchronizing burst having a predetermined frequency and phase and modulated subcarrier, said modulated subcarrier containing a plurality of color-difference signals, each of said plurality of color-difference signals susceptible to the processes of synchronous detection and identified by a prescribed phase relative to said predetermined phase, said color television receiver also including a burst synchronized signal source including synchronizing signal apparatus responsive to said color synchronizing burst for developing a reference signal having a frequency and phase prescribed by said color synchronizing burst, a quasi-balanced demodulator circuit, comprising in combination, a first synchronous detector circuit, a second synchronous detector circuit, and a third synchronous detector circuit, each of said synchronous detector circuits coupled to said source of color television signals and to said burst synchronized signal source and operatively connected to provide synchronous detection of a color difference signal corresponding to a predetermined phase of said reference signal and including an output terminal and an output reference potential terminal and a fixed potential terminal, means for developing at each of said output reference potential terminals a potential level corresponding to the amplitude level of said reference signal being employed in the processes of synchronous detection, a detector circuit coupled to said burst synchronized signal source to detect the amplitude level of said reference signal, and means for coupling said detector circuit between said output reference level terminal and said fixed potential terminal to provide compensation of the amplitude of the detected color-difference signals appearing at each of the output terminals of said first synchronous detector circuit, said second synchronous detector circuit, and said third synchronous detector circuit corresponding to variations in amplitude of said reference signal.

12. The invention as set forth in claim 11 and wherein each of said synchronous detector circuits includes an input terminal, a rectifier and a decay circuit and a delay line, means for coupling said decay circuit between said output terminal and said output reference potential terminal, means for coupling said modulated subcarrier to said input circuit, means for coupling said rectifier between said input terminal and said decay circuit, means for coupling said delay line between a predetermined side of said rectifier and said burst synchronized signal source for causing synchronous detection due to envelope sampling of said modulated subcarrier at a time interval corresponding to the phase determined by said delay line.

13. The invention as set forth in claim 11 and wherein each of said synchronous detector circuits includes a filter network, said filter network means for coupling to said output terminal for eliminating a predetermined range of frequencies from the signal as provided by said synchronous detector circuit.

14. In a television receiver including a source of color television signals including a color synchronizing burst and a modulated subcarrier, said modulated subcarrier including at least a trio of color-difference signals, each of said trio of color-difference signals susceptible to demodulation by the processes of synchronous detection and bearing a prescribed phase relationship with respect to said color synchronizing burst, said color television receiver including a burst synchronized signal source, said burst synchronized signal source including synchronizing apparatus responsive to said color synchronizing burst to develop a reference signal having a frequency and phase prescribed by said color synchronizing burst, a quasi-balanced diode demodulator comprising in combination, a first diode synchronous demodulator circuit, a second diode synchronous demodulator circuit, and a third diode synchronous demodulator circuit, each including a rectifier device having an anode and a cathode, a resistance-condenser-decay network, a phase shift device, an input terminal coupled to said source of color television signals, and an output terminal, means for coupling the cathodes of each of said rectifiers of said first diode synchronous detector, said second diode synchronous detector and said third diode synchronous detector to said input terminal, a first fixed potential terminal, means for coupling said resistance-condenser decay network in each of said diode synchronous detectors between said first fixed potential terminal and the anode of said rectifier in that synchronous detector, means for coupling said phase shift device for each of said diode synchronous detectors between said burst synchronized signal source and said anode of said rectifier device of the corresponding diode synchronous detector, means for coupling said output terminal of each of said diode synchronous detectors to the anode of said rectifier device of that diode synchronous detector, a second fixed potential terminal, a peak detector circuit, means for coupling said peak detector circuit to said burst synchronized signal source to develop a signal between said first fixed potential terminal and said second fixed potential terminal which compensates for any amplitude variations appearing at the output terminals of each of said diode synchronous detector circuits due to variations in amplitude of said burst synchronized signal source, means for applying the color-difference signals appearing respectively between each of said output terminals and said second fixed potential terminal to a utilization means in said color television receiver.

15. The invention as set forth in claim 14 and wherein each of said diode synchronous demodulators is coupled to a second output terminal through a bandpass amplifier, said bandpass amplifier having a pass band suitable to eliminate a prescribed range of frequencies from the synchronously detected signal provided by the diode synchronous demodulator.

16. The invention as set forth in claim 14 and wherein said detector circuit includes a diode in series with a decay circuit, said diode having an anode and a cathode, means for coupling said anode of said diode to said burst synchronized signal source, means for coupling said cathode of said diode to said first fixed potential terminal, and means for coupling said decay circuit between said first fixed potential terminal and said second fixed potential terminal.

17. The invention as set forth in claim 14 and wherein said detector circuit includes an amplitude adjusting control, said amplitude adjusting control providing adjustment of the amplitude of any signal delivered by said peak detector circuit between said first fixed potential terminal and said second fixed potential terminal.

18. A synchronous detector circuit comprising in combination, a first circuit to provide a chrominance signal comprising a modulated subcarrier wherein occur different color difference signals at different phases, each of said color difference signals capable of being demodulated by interaction in a signal mixing device of said chrominance signal and a demodulating signal having the phase of the chrominance signal at which the color difference signal to be demodulated occurs; a second circuit to provide a demodulating signal having a predetermined phase of said chrominance signal corresponding to the phase at which information relating to a first color difference signal, occurs therein, said demodulating signal capable of having envelope variations; an envelope detector means coupled to said second circuit and comprising apparatus to detect the envelope of said demodulating signal and to produce therefrom a unidirectional reference signal having amplitude variations which correspond to any variations of the amplitude of said envelope; signal mixing means; means coupled between said first and second circuits and said signal mixing means to apply said chrominance signal and said demodulating signal to said signal mixing means to develop therein a demodulated signal corresponding to said first color difference signal, and means coupling said envelope detection circuit to said signal mixing means to control the amplitude of said demodulated first signal as a predetermined function of the amplitude of said reference signal to produce an output first color difference signal whose output level does not vary as a result of any variations in the amplitude of the envelope of said demodulating signal.

19. A synchronous detector circuit adapted to receive a chrominance signal containing a plurality of modulating signals, each of said plurality of modulating signals occurring at a prescribed phase of said chrominance signal and capable of being demodulated by a synchronous detector wherein said chrominance signal is heterodyned with a signal having a phase corresponding to the phase of the modulating signal to be demodulated; said synchronous detector circuit comprising in combination: a synchronous detector having a control terminal, said synchronous detector comprising apparatus to synchronously detect a signal in a chrominance signal responsive to a chrominance signal and a heterodyning wave of prescribed phase applied thereto, the amplitude level of signals detected in synchronous detector being controllable in accordance with the amplitude of a control signal applied to said control terminal, means to apply said chrominance signal to said synchronous detector, a circuit to provide a heterodyning wave capable of having variations in envelope amplitude and having a predetermined phase of said chrominance signal at which information occurs relating to a first color difference signal, means coupling said heterodyning wave providing circuit to said synchronous detector to apply said heterodyning wave to said synchronous detector to cause heterodyning between said demodulating wave and said chrominance signal therein thereby producing said first color difference signal, a peak detector circuit coupled to said heterodyning wave providing means to peak detect said heterodyning wave and to derive therefrom a control voltage having an amplitude which is a function of the amplitude of the envelope of said heterodyning wave; and means coupled between said peak detector and said control terminal to apply said control voltage to said control terminal for controlling the amplitude level of said first color difference signal in accordance with the amplitude of said control voltage whereby the amplitude level of said first color difference signal does not include variations which follow any amplitude variations in said heterodyning wave.

References Cited in the file of this patent

UNITED STATES PATENTS

| | | |
|---|---|---|
| 2,664,462 | Bedford | Dec. 29, 1953 |
| 2,680,147 | Rhodes | June 1, 1954 |
| 2,743,310 | Schroeder | Apr. 24, 1956 |
| 2,745,900 | Parker | May 15, 1956 |
| 2,754,356 | Espenlaub | July 10, 1956 |

OTHER REFERENCES

Color TV, Rider Publication, March 1954, pages 141 and 142.

Two-Color Receiver, R. C. A., November 1949, pages 16 and 17.